United States Patent
Shinohara

(10) Patent No.: US 9,649,537 B2
(45) Date of Patent: *May 16, 2017

(54) SOLID GOLF BALL

(71) Applicant: Bridgestone Sports Co., Ltd., Minato-ku (JP)

(72) Inventor: Hirotaka Shinohara, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 14/474,582

(22) Filed: Sep. 2, 2014

(65) Prior Publication Data

US 2014/0371004 A1    Dec. 18, 2014

Related U.S. Application Data

(63) Continuation of application No. 13/292,678, filed on Nov. 9, 2011, now Pat. No. 8,845,458.

(51) Int. Cl.
*A63B 37/04* (2006.01)
*A63B 37/00* (2006.01)
*C08G 18/48* (2006.01)
*C08G 18/76* (2006.01)
*C09D 175/08* (2006.01)
*C08L 75/04* (2006.01)

(52) U.S. Cl.
CPC ...... *A63B 37/0058* (2013.01); *A63B 37/0003* (2013.01); *A63B 37/0063* (2013.01); *A63B 37/0074* (2013.01); *A63B 37/0076* (2013.01); *A63B 37/0081* (2013.01); *A63B 37/0084* (2013.01); *C08G 18/4854* (2013.01); *C08G 18/7671* (2013.01); *C09D 175/08* (2013.01); *A63B 37/0031* (2013.01); *A63B 37/0033* (2013.01); *A63B 37/0035* (2013.01); *A63B 37/0043* (2013.01); *A63B 37/0064* (2013.01); *A63B 37/0066* (2013.01); *C08L 75/04* (2013.01)

(58) Field of Classification Search
USPC .................................. 473/351–377
See application file for complete search history.

(56) References Cited

U.S. PATENT DOCUMENTS

| | | |
|---|---|---|
| 5,688,192 A | 11/1997 | Aoyama |
| 5,823,889 A | 10/1998 | Aoyama |
| 5,984,807 A | 11/1999 | Wai et al. |
| 6,194,505 B1 | 2/2001 | Sone et al. |
| 6,203,450 B1 | 3/2001 | Bradley et al. |
| 6,361,453 B1 | 3/2002 | Nakamura et al. |
| 6,440,346 B1 | 8/2002 | Wai et al. |
| 6,642,314 B2 | 11/2003 | Sone et al. |
| 6,692,380 B2 | 2/2004 | Sullivan et al. |
| 7,270,610 B1 | 9/2007 | Sullivan et al. |
| 7,294,680 B2 | 11/2007 | Sone et al. |
| 7,329,194 B2 | 2/2008 | Watanabe et al. |
| 7,819,761 B2 | 10/2010 | Kim et al. |
| 7,867,419 B2 | 1/2011 | Ohira et al. |
| 8,113,966 B2 | 2/2012 | Kim et al. |
| 8,845,458 B2 * | 9/2014 | Shinohara .......... A63B 37/0058 473/377 |
| 9,005,049 B2 * | 4/2015 | Shinohara .......... A63B 37/0058 473/351 |
| 9,044,644 B2 * | 6/2015 | Shinohara .......... A63B 37/0058 |

FOREIGN PATENT DOCUMENTS

| | | |
|---|---|---|
| JP | 61-94666 A | 5/1986 |
| JP | 11-35633 A | 2/1999 |
| JP | 11-164912 A | 6/1999 |
| JP | 2002-17897 A | 1/2002 |
| JP | 2002-65895 A | 3/2002 |
| JP | 2002-293996 A | 10/2002 |
| JP | 2007-319660 A | 12/2007 |
| JP | 2009-131631 A | 6/2009 |
| JP | 2011-5329 A | 1/2011 |
| JP | 2013-132312 A | 7/2013 |

* cited by examiner

*Primary Examiner* — Alvin Hunter
(74) *Attorney, Agent, or Firm* — Sughrue Mion, PLLC

(57) ABSTRACT

The invention provides a solid golf ball which has a core of at least one layer and a cover of at least one layer. At least one layer of the core is formed primarily of polybutadiene and includes at least 0.05 part by weight of a polyurethane resin powder having an average particle size of not more than 2 mm per 100 parts by weight of rubber component. At least one layer of the cover is formed primarily of polyurethane.

8 Claims, No Drawings

SOLID GOLF BALL

This is a continuation of application Ser. No. 13/292,678 filed Nov. 9, 2011, the contents of which are incorporated herein by reference in their entirety.

BACKGROUND OF THE INVENTION

The present invention relates to a solid golf ball having a cover made of polyurethane resin, which golf ball is endowed with a high rebound, a suitable feel on impact and an excellent durability.

Recently, the idea of, from an environmental standpoint, utilizing waste materials by incorporating such materials in golf ball core- or cover-forming materials has begun to emerge in the golf ball industry. The basic characteristics of golf balls include flight performance, feel on impact, and durability. When a waste material is included in the core or cover, it is essential to choose the type and amount of waste material included in such a way as not to markedly worsen these basic properties.

For example, U.S. Pat. No. 6,203,450 describes the compounding of polyurethane rubber in the core material. However, the resulting golf ball can hardly be said to have a suitable feel, and moreover is unable to achieve a reduced spin rate.

Also, golf balls which use a polyurethane material as the cover material instead of the ionomers commonly used to date have become quite prominent lately. These golf balls with a polyurethane cover are capable of having an improved flight performance on shots with a driver, and also improved controllability owing to increased spin on approach shots.

JP-A 2011-005329 discloses that, by granulating an ionomer resin which was used as a cover material and including the granulated resin in a core-forming rubber composition, it is possible to utilize a waste material while suppressing a decline in ball performance.

However, the foregoing art does not make use of a polyurethane cover. Nor does it achieve improvements in the durability, spin performance and feel of golf balls which have a polyurethane cover and are composed of two or more pieces.

SUMMARY OF THE INVENTION

It is therefore an object of the present invention to provide a solid golf ball having a polyurethane cover, which golf ball is environmentally beneficial in that it utilizes a waste material, and moreover, in spite of utilizing a waste material, is able to maintain the basic characteristics of the ball at a high level.

As a result of extensive investigations, the inventor has discovered that, in a solid golf ball having a core formed primarily of polybutadiene rubber and a cover formed primarily of polyurethane, by choosing a waste material which is a polyurethane resin powder having an average particle size of not more than 2 mm and compounding a specific amount of this waste material in the core-forming rubber composition, adhesion between the core and cover dramatically improves. As a result, the ball maintains a high rebound and a high initial velocity and also achieves a spin rate lowering effect on full shots, enabling the distance traveled by the ball to be increased. In addition, the durability of the ball to cracking can be increased.

Accordingly, the invention provides the following solid golf ball.

[1] A solid golf ball comprising a core of at least one layer and a cover of at least one layer, wherein at least one layer of the core is formed primarily of polybutadiene and includes at least 0.05 part by weight of a polyurethane resin powder having an average particle size of not more than 2 mm per 100 parts by weight of rubber component, and at least one layer of the cover is formed primarily of polyurethane.

[2] The solid golf ball of [1], wherein the core layer which includes the polyurethane resin powder adjoins the cover layer composed primarily of polyurethane.

[3] The solid golf ball of [1], wherein the core includes at least 5 parts by weight of methacrylic acid and/or a metal salt of methacrylic acid as a co-crosslinking agent per 100 parts by weight of rubber component.

[4] The solid golf ball of [1], wherein the polyurethane resin powder has been granulated by a granulator to an average particle size of not more than 1 mm.

[5] The solid golf ball of [1], wherein the polyurethane resin powder is composed primarily of a thermoplastic polyurethane and has a melting point of from 150 to 320° C.

[6] The solid golf ball of [1], wherein the core has a hardness designed so as to gradually increase from a center of the core toward a surface of the core.

[7] The solid golf ball of [1] which has been produced by treating a surface of the core with a solution containing a haloisocyanuric acid and/or a metal salt thereof, then encasing the core in a cover layer.

DETAILED DESCRIPTION OF THE INVENTION

The invention is described more fully below.

The internal structure of the solid golf ball of the present invention, although not illustrated here, is composed, as in conventional golf balls, of a core and one or a plurality of layers encasing the core. The core may be a single layer or may be formed as a plurality of two or more layers.

The core used in this invention is formed of a material which is composed primarily of a rubber material and includes also a polyurethane powder.

In the invention, preferred rubber compositions for forming the core are exemplified by the rubber compositions formulated as described below.

For example, the core may be formed using a rubber composition obtained by compounding an unsaturated carboxylic acid or a metal salt thereof, an organic peroxide, an inert filler or an antioxidant with a known base rubber.

Polybutadiene may be advantageously used as the base rubber. In particular, it is desirable for this polybutadiene to be one which includes cis-1,4-bonds on the polymer chain in an amount of preferably at least 60 wt %, more preferably at least 80 wt %, even more preferably at least 90 wt %, and most preferably at least 95 wt %. If the cis-1,4-bonds account for too few of the bonds on the molecule, the rebound may decrease. The content of 1,2-vinyl bonds included in the above polybutadiene is preferably not more than 2 wt %, more preferably not more than 1.7 wt %, and even more preferably not more than 1.5 wt %, of the polymer chain. If the content of 1,2-vinyl bonds is too high, the rebound may decrease.

To obtain a molded and vulcanized material having a good resilience, the polybutadiene used is preferably one synthesized with a rare-earth catalyst or a Group VIII metal compound catalyst. Polybutadiene synthesized with a rare-earth catalyst is especially preferred. If necessary, an organoaluminum compound, an alumoxane, a halogen-bearing compound and a Lewis base may be used in combination with these catalysts. In the invention, preferred use may be made of, as the various above compounds, those compounds mentioned in JP-A 11-35633.

Of the above rare-earth catalysts, the use of a catalyst which employs a lanthanum series rare-earth compound is preferred. Examples of suitable lanthanide series rare-earth compounds include halides, carboxylates, alcoholates, thio-alcoholates and amides of atomic number 57 to 71 metals.

The use of a neodymium catalyst in which a neodymium compound serves as the lanthanide series rare-earth compound is recommended because such a catalyst enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633, JP-A 11-164912 and JP-A 2002-293996. From the standpoint of increasing resilience, it is desirable for polybutadiene synthesized using a lanthanum series rare-earth compound catalyst to account for preferably at least 10 wt %, more preferably at least 20 wt %, and even more preferably at least 40 wt %, of the rubber components.

Rubber components other than the foregoing polybutadiene may be included in the rubber composition insofar as the objects of the invention are attainable. Illustrative examples of rubber components other than the foregoing polybutadiene include other polybutadienes, and other diene rubbers, such as styrene-butadiene rubber, natural rubber, isoprene rubber and ethylene-propylene-diene rubber.

Examples of unsaturated carboxylic acids include acrylic acid, methacrylic acid, maleic acid and fumaric acid. Acrylic acid and methacrylic acid are especially preferred.

Examples of metal salts of unsaturated carboxylic acids include metal salts of methacrylic acid, such as zinc methacrylate and magnesium methacrylate, and metal salts of acrylic acid, such as zinc acrylate. The use of zinc methacrylate or magnesium methacrylate is especially preferred.

The amount of the unsaturated carboxylic acid and/or metal salt thereof included per 100 parts by weight of the base rubber may be set to preferably at least 5 parts by weight, more preferably at least 10 parts by weight, and even more preferably at least 15 parts by weight. The upper limit may be set to preferably not more than 60 parts by weight, more preferably not more than 50 parts by weight, even more preferably not more than 40 parts by weight, and most preferably not more than 30 parts by weight. Including too much may make the ball too hard, resulting in an unpleasant feel on impact, whereas including too little may result in a poor durability and a decreased rebound.

The organic peroxide may be a commercially available product, suitable examples of which include Percumyl D (available from NOF Corporation), Perhexa 3M (NOF Corporation), Perhexa C-40 (NOF Corporation), and Luperco 231XL (Atochem Co.).

The amount of organic peroxide included per 100 parts by weight of the base rubber may be set to preferably at least 0.1 part by weight, more preferably at least 0.3 part by weight, even more preferably at least 0.5 part by weight, and most preferably at least 0.7 part by weight. The upper limit may be set to preferably not more than 5 parts by weight, more preferably not more than 4 parts by weight, even more preferably not more than 3 parts by weight, and most preferably not more than 2 parts by weight. Too much or too little organic peroxide may make it impossible to achieve a ball having a good feel, durability and rebound.

Examples of inert fillers that may be preferably used include zinc oxide, barium sulfate and calcium carbonate. These may be used singly or as a combination of two or more thereof.

The amount of inert filler included per 100 parts by weight of the base rubber may be set to preferably at least 1 part by weight, and more preferably at least 5 parts by weight. The upper limit may be set to preferably not more than 100 parts by weight, more preferably not more than 80 parts by weight, and even more preferably not more than 60 parts by weight. Too much or too little inert filler may make it impossible to achieve a proper weight and a suitable rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (Yoshitomi Pharmaceutical Industries, Ltd.). These may be used singly or as a combination of two or more thereof.

The amount of antioxidant included may be more than 0, and is set to preferably at least 0.05 part by weight, and especially at least 0.1 part by weight, per 100 parts by weight of the base rubber. The upper limit, although not subject to any particular limitation, may be set to preferably not more than 3 parts by weight, more preferably not more than 2 parts by weight, even more preferably not more than 1 part by weight, and most preferably not more than 0.5 part by weight, per 100 parts by weight of the base rubber. Too much or too little antioxidant may make it impossible to obtain a suitable core hardness gradient, as a result of which a good rebound and durability and a good spin-rate lowering effect on full shots may not be achievable.

The present invention blends a polyurethane resin powder of a specific particle diameter with the above-described rubber components of the core. The polyurethane resin powder used in the invention may be obtained by Method (i) or Method (ii) below.

Method (i)

In cases where golf ball covers are made of polyurethane resin, advantageous use can be made of the resin in the runners and of the flash generated during molding which are discarded as scrap when such golf ball covers are molded, and also of the powder and other finely ground material obtained when surface grinding golf balls.

Method (ii)

Use can be made of the material obtained by using a granulator to finely grind defective moldings and golf balls that have been used and discarded, screening the resulting finely ground material, and collecting from this material polyurethane resin powder having a particle diameter at or below a given size.

The grinding size, or average particle size, of the polyurethane resin powder is preferably not more than 2.0 mm, more preferably not more than 1.5 mm, and even more preferably not more than 1.0 mm.

The polyurethane resin powder may be either a thermoplastic polyurethane or a thermoset polyurethane resin, although the use of a thermoplastic polyurethane is more preferred.

The present invention, by including a polyurethane resin powder in the core material as described above, imparts a suitable surface roughness to the core, thereby making it possible to increase the contact surface area with the adjoining cover and improve adhesion on account of an anchoring effect. In particular, by using a thermoplastic polyurethane in the cover material, the polyurethane resin which is included in the cover material and the core material melts during molding of the cover material, enabling adhesion between the core and the cover to be increased even further.

The above polyurethane resin powder is included in an amount, per 100 parts by weight of the rubber component, of at least 0.05 part by weight, preferably at least 0.1 part by weight, more preferably at least 1.5 parts by weight, even more preferably at least 3 parts by weight, and most preferably at least 5 parts by weight. The upper limit is preferably not more than 40 parts by weight, more preferably not more than 30 parts by weight, even more preferably not more than 20 parts by weight, and most preferably not more than 10 parts by weight.

In cases where use is made of the above thermoplastic polyurethane powder, it is preferable to use one having a powder melting point of at least 150° C. The melting point is more preferably at least 160° C., and even more preferably at least 170° C., but is preferably not more than 320° C., more preferably not more than 300° C., and even more preferably not more than 280° C. If the powder melting point is too low, the powder will end up melting at the time of core vulcanization, which may result in a loss of core durability and symmetry. On the other hand, if the melting point is too high, it will not be possible to melt the polyurethane at the surface during cover molding, as a result of which the additional durability improving effect arising from use of a thermoplastic polyurethane may not be attainable.

The core used in the invention is not subject to any particular limitation. However, by treating the core surface with a solution containing a haloisocyanuric acid and/or a metal salt thereof, then encasing the treated core with the cover material, golf ball adhesion can be improved. The haloisocyanuric acid and/or a metal salt thereof is preferably one or more selected from among chloroisocyanuric acid, sodium chloroisocyanurate, potassium chloroisocyanurate, dichloroisocyanuric acid, sodium dichloroisocyanurate, potassium dichloroisocyanurate and trichloroisocyanuric acid. These are readily hydrolyzed by water to form acid and chlorine, and thus play an initiator-like role in addition reactions to the double bonds in the diene rubber molecules. The use of trichloroisocyanuric acid provides an especially outstanding adhesion-improving effect.

The core in the invention preferably has a hardness that gradually increases from the center of the core to the surface of the core. By imparting the core with a suitable hardness profile, energy loss can be reduced, enabling the core rebound to be effectively increased.

The rubber composition containing the respective above ingredients is prepared by mixture using an ordinary mixing apparatus, such as a Banbury mixer or a roll mill. When the above rubber composition is used to mold a core, molding may be carried out by compression molding or injection molding in a given core mold. The molding thus obtained is heated and cured under temperature conditions sufficient for the organic peroxide and the co-crosslinking agent included in the rubber composition to act, thereby giving a core having a specific hardness profile. Although the vulcanization conditions are not subject to any particular limitation, the vulcanization temperature is generally in a range of about 150° C. to about 200° C., with the lower limit being preferably at least 155° C. and the upper limit being preferably not more than 180° C., more preferably not more than 175° C., and most preferably not more than 170° C. The vulcanization time is generally in a range of from about 10 to about 40 minutes, with the lower limit being preferably at least 12 minutes and the upper limit being preferably not more than 30 minutes, more preferably not more than 25 minutes, and most preferably not more than 20 minutes.

The core has a diameter which, although not subject to any particular limitation, is preferably at least 38.0 mm, more preferably at least 38.9 mm, and even more preferably at least 39.3 mm, but is preferably not more than 42.1 mm, and more preferably not more than 41.1 mm. At a core diameter outside of this range, the durability of the ball to cracking may dramatically decrease and the initial velocity of the ball may become lower.

It is recommended that the core have a specific gravity of at least 1.05, preferably at least 1.08, and more preferably at least 1.1, but not more than 1.2, preferably not more than 1.15, and more preferably not more than 1.13.

At least one layer of the cover used in the invention is formed primarily of polyurethane. The polyurethane is not subject to any particular limitation, and may be either a thermoplastic polyurethane or a thermoset polyurethane. A material which is capable of fusion-bonding with the above-described polyurethane powder is especially preferred. A resin which is thermoplastic like the polyurethane powder is preferred because fusion-bonding can be expected to occur. In particular, preferred use may be made of a polyurethane having a high isocyanate content because adhesion with the core material can thereby be improved.

Specifically, the following polyurethane material may be used.

A material formed by injection-molding a single resin blend in which the primary components are (A) a thermoplastic polyurethane and (B) a polyisocyanate compound. It is preferable for at least some portion of the polyisocyanate compound present in the resin blend to be polyisocyanate compound in which all the isocyanate groups on the molecule remain in an unreacted state.

Such a polyisocyanate compound can effectively promote fusion-bonding with the polyurethane powder included in the core, and can therefore enhance adhesion between the core and the cover material.

In describing the thermoplastic polyurethane A, the structure of this thermoplastic polyurethane includes soft segments composed of a polymeric polyol (polymeric glycol) that is a long-chain polyol, and hard segments composed of a chain extender and a polyisocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of cyclic ethers. The polyether polyol may be used singly or as a combination of two or more thereof. Of the above, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls which are made with a thermoplastic polyurethane composition and have excellent properties such as rebound and manufacturability can be reliably obtained. The number-average molecular weight of the long-chain polyol is more preferably in a range of 1,700 to 4,000, and even more preferably in a range of 1,900 to 3,000. The number-average molecular weight of the long-chain polyol refers here to the number-average molecular weight computed based on the hydroxyl number measured in accordance with JIS K-1557.

Chain extenders that may be suitably used include those employed in the prior art relating to thermoplastic polyurethanes. For example, low-molecular-weight compounds which have a molecular weight of 400 or less and have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred; 1,4-butylene glycol is more preferred.

The polyisocyanate compound is not subject to any particular limitation; preferred use may be made of one that is used in the prior art relating to thermoplastic polyurethanes. Specific examples include one or more selected from the group consisting of 4,4'-diphenylmethane diisocyanate, 2,4- or 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate. The mixing ratio of active hydrogen atoms to isocyanate groups in the above polyurethane-forming reaction may be adjusted within a desirable range so as to make it possible to obtain a golf ball which is composed of a thermoplastic polyurethane composition and has various improved properties, such as rebound, spin performance, scuff resistance and manufacturability.

Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane used as component A. Production may be carried out by either a prepolymer process or a one-shot process which uses a long-chain polyol, a chain extender and a polyisocyanate compound and employs a known urethane-forming reaction. Of these, a process in which melt polymerization is carried out in a substantially solvent-free state is preferred. Production by continuous melt polymerization using a multiple screw extruder is especially preferred.

It is also possible to use a commercially available product as the thermoplastic polyurethane serving as component A. Illustrative examples include Pandex T8295, Pandex T8290, Pandex T8260, Pandex T8295, Pandex T8290, Pandex T8180 and Pandex T8195 (all available from DIC Bayer Polymer, Ltd.).

Next, concerning the polyisocyanate compound used as component B, it is necessary that, in at least some portion of the polyisocyanate compound within the single resin blend, all the isocyanate groups on the molecule remain in an unreacted state. That is, some polyisocyanate compound in which the isocyanate groups on the molecule remain in a completely free state must be present within the resin blend; such a polyisocyanate compound may be present together with polyisocyanate compound in which some of the isocyanate groups on the molecule are in a free state.

Various types of isocyanates may be employed without particular limitation as the polyisocyanate compound. Illustrative examples include one or more selected from the group consisting of 4,4'-diphenylmethane diisocyanate, 2,4- or 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of, for example, the rise in viscosity accompanying the reaction with the thermoplastic polyurethane serving as component A, and the physical properties of the resulting golf ball cover material.

In the invention, a thermoplastic elastomer other than the above-described thermoplastic polyurethane may be included as component C together with components A and B. Including this component C in the above resin blend enables the flow properties of the resin blend to be further improved and enables improvements to be made in various properties required of golf ball cover materials, such as resilience and scuff resistance.

The thermoplastic elastomer other than the above thermoplastic polyurethane which is used as component C may be of one, two or more types selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. In particular, because they increase the resilience and scuff resistance due to reaction with the isocyanate groups while at the same time maintaining a good productivity, the use of polyester elastomers, polyamide elastomers and polyacetals is especially preferred.

The above components A, B and C have a compositional ratio, expressed as a weight ratio, which, although not subject to any particular limitation, is preferably A:B:C=100:2 to 50:0 to 50, and more preferably A:B:C=100:2 to 30:8 to 50.

The resin blend is prepared by mixing together component A, component B and, additionally, component C. At this time, it is preferable to select conditions such that, of the polyisocyanate compound, there exists at least some portion in which all the isocyanate groups remain in an unreacted state.

This resin blend is then injection-molded around a core that has been placed in a mold. For easy and trouble-free handling, it is preferable to form the resin blend into pellets having a length of 1 to 10 mm and a diameter of 0.5 to 5 mm. Isocyanate groups in an unreacted state remain within these resin pellets; while the resin blend is being injection-molded about the core, or due to post-treatment such as annealing thereafter, the unreacted isocyanate groups react with component A and component C to form a crosslinked material.

In addition, various additives other than the ingredients making up the thermoplastic polyurethane may also be optionally included in the resin blend. For example, pigments, dispersants, antioxidants, light stabilizers, ultraviolet absorbers, and parting agents may be suitably included.

This resin blend has a melt mass flow rate (MFR) at 210° C. which is not subject to any particular limitation, but, from the standpoint of increasing the flow properties and manufacturability, is preferably at least 5 g/10 min, and more preferably at least 6 g/10 min. If the melt mass flow rate of the resin blend is low, the flow properties will decrease, which may cause eccentricity during injection molding and may also lower the degree of freedom in the thickness of the cover that can be molded. Melt mass flow rate measurements are values obtained in accordance with JIS K-7210 (1999 edition).

At least one layer of the cover of one or more cover layer is formed of the above-described thermoplastic polyurethane. The surface hardness of the cover layer formed of the above thermoplastic polyurethane composition has a Durometer D hardness of generally at least 30, preferably at least 35, more preferably at least 40, and even more preferably at least 45, but generally not more than 90, preferably not more than 85, more preferably not more than 80, and even more preferably not more than 75. If the surface hardness of the cover layer is too low, the spin rate on shots with a driver may increase, lowering the distance of the ball. On the other hand, if the surface hardness of the cover layer is too high, the feel on impact may worsen and the resilience and durability performances of the polyurethane material may diminish.

In the invention, the durometer D hardness refers to the hardness as measured with a type D durometer in accordance with JIS K7215.

The above cover layer has a rebound resilience of generally at least 35%, preferably at least 40%, more preferably at least 45%, and even more preferably at least 47%. Because thermoplastic polyurethane does not have that high a resilience to begin with, strict selection of the rebound resilience is preferred. If the rebound resilience of the cover layer is too low, the distance traveled by the golf ball may greatly decrease. On the other hand, if the rebound resilience of the cover layer is too high, the initial velocity on shots under 100 yards requiring control and on puts will be too high, and may not feel right to the golfer. In the present invention, the rebound resilience refers to a value measured in general accordance with JIS K7311.

The cover thickness is preferably at least 0.3 mm, more preferably at least 0.5 mm, and even more preferably at least 0.7 mm, but is generally not more than 2.5 mm, preferably not more than 2.1 mm, more preferably not more than 1.9 mm, even more preferably not more than 1.8 mm, and most preferably not more than 1.7 mm. At a cover thickness larger that the above range, the rebound may decrease, which may adversely affect the flight performance. On the other hand, at a cover thickness smaller than the above range, the durability to cracking may decrease. In particular, when the ball is topped, the cover may tear.

The cover has a specific gravity of preferably at least 1.1.3, more preferably at least 1.14, and even more preferably at least 1.15, but preferably not more than 1.30, more preferably not more than 1.20, and even more preferably not more than 1.17.

Numerous dimples may be formed on a surface of an outermost layer of the cover. Known art may be suitably employed with regard to the number and shapes of the dimples. Also, a coat of paint may be applied to the surface of the ball, in which case known art may be suitably employed with regard to the paint and the painting process.

The ball has a diameter of generally not less than 42 mm, preferably not less than 42.3 mm, and more preferably not less than 42.67 mm, but generally not more than 44 mm, preferably not more than 43.8 mm, even more preferably not more than 43.5 mm, and still more preferably not more than 43 mm.

The ball has a weight of preferably not less than 44.5 g, more preferably not less than 44.7 g, even more preferably not less than 45.1 g, and most preferably not less than 45.2 g, but preferably not more than 47.0 g, more preferably not more than 46.5 g, and even more preferably not more than 46.0 g.

The ball has a deflection, when compressed under a final load of 1,275 N (130 kgf) from an initial load of 98 N (10 kgf), of preferably at least 2.0 mm, more preferably at least 2.3 mm, and even more preferably at least 2.4 mm, but preferably not more than 7.0 mm, more preferably not more than 5.0 mm, and even more preferably not more than 4.0 mm. If the deflection is too small, the feel on impact may be harder, making the ball uncomfortable to use. On the other hand, if the deflection is too large, the durability of the ball to cracking may decrease.

As described above, the solid golf ball of the invention, by utilizing a waste material, conserves natural resources and thus benefits the global environment. Moreover, the inventive golf ball maintains a high rebound and initial velocity in spite of having a polyurethane cover, thus increasing the distance traveled by the ball, and moreover is able to enhance the durability of the ball to cracking. The solid golf ball of the invention also has an excellent adhesion between the core and the cover.

EXAMPLES

Examples of the invention and Comparative Examples are given below by way of illustration, and not by way of limitation.

Examples 1 to 6

Comparative Examples 1 to 3

Rubber compositions (MAA blend and ZDA blend) made up of the ingredients shown in Table 1 below were used. A polyurethane resin powder was included in the core formulation in each of the Examples and Comparative Examples, except for Comparative Examples 1 and 2. Specifically, the solid cores in the respective examples were fabricated using granulated polyurethane scrap from molding operations and also polyurethane resin powder obtained by granulating golf balls in which polyurethane resin had been used as the cover material. During mixing, these polyurethane resin powders were charged together with the various materials in Table 1 below, and the molded material was vulcanized at 170° C. for 20 minutes. Ingredient amounts in Table 1 are shown in parts by weight.

TABLE 1

| Core Formulation | | MAA blend | ZDA blend |
|---|---|---|---|
| cis-1,4-Polybutadiene | | 100 | 100 |
| Zinc oxide | | 23 | 6 |
| Antioxidant | | 0.2 | 0.2 |
| Zinc acrylate | | — | 31 |
| Methacrylic acid | | 22.5 | — |
| Crosslinking agent | Percumyl D | 0.8 | 0.6 |
| (organic peroxide) | Perhexa C-40 | — | 0.6 |

Details of the above ingredients are given below. The numbers shown above indicate parts by weight.

cis-1,4-Polybutadiene: A polybutadiene rubber synthesized with a nickel catalyst (Mooney viscosity ML, 46), available as "BR01" from JSR Corporation
Zinc oxide: Available from Sakai Chemical Co., Ltd.
Antioxidant: "Nocrac NS-6," available from Ouchi Shinko Chemical Industry Co., Ltd.
Zinc acrylate: Available from Nihon Jyoryu Kogyo Co., Ltd.
Methacrylic acid: Methacrylic acid available from Kuraray Co., Ltd.
Organic peroxides: "Perhexa C-40" (40% dilution product), available from NOF Corporation
"Percumyl D," available from NOF Corporation The cores having a diameter of 39.9 mm that were vulcanized and formulated as described above had the hardness profiles shown in Table 2 below.

Cross-Sectional Hardness of Core

The core was cut with a fine cutter and the JIS-C hardness at each of the positions mentioned below was measured in accordance with JIS K6301-1975 after holding the core isothermally at 23±1° C. (at two places in each of N=5 samples).

Surface Hardness of Core

JIS-C hardness measurements were carried out on the core surface in accordance with JIS K6301-1975 after holding the core isothermally at 23±1° C. (at two places in each of N=5 samples).

TABLE 2

| Type of Core | Core center (JIS-C hardness) | 15 mm inside core surface (JIS-C hardness) | 10 mm inside core surface (JIS-C hardness) | 5 mm inside core surface (JIS-C hardness) | Core surface (JIS-C hardness) | Center – Surface (JIS-C hardness) |
|---|---|---|---|---|---|---|
| MAA blend | 64 | 67 | 69 | 69 | 72 | 8 |
| ZDA blend | 61 | 65 | 69 | 75 | 78 | 17 |

Adhesion-Enhancing Treatment

After the rubber composition formulated from the ingredients in Table 1 was molded and vulcanized to form a core, the surface of the core was abraded to a desired diameter. Next, surface treatment of the core was carried out by immersing the core for 30 seconds in an acetone solution of trichloroisocyanuric acid (concentration, 3 wt %), then washing the surface of the core with water. The core was then set in a mold for injection molding the cover, and the cover composition shown in Table 3 below was injection-molded over the solid core.

Next, the cover starting materials indicated below (units are in parts by weight) were mixed under a nitrogen atmosphere in a twin-screw extruder to form a cover resin blend. This cover resin blend was used in common for all the Examples of the invention and the Comparative Examples.

Cover Formulation

| "T8295" (trade name) | 100 parts by weight |
|---|---|
| Titanium oxide | 3.8 parts by weight |
| Polyethylene wax | 0.5 part by weight |
| Isocyanate compound | 9 parts by weight |

"T8295" (trade name): A MDI-PTMG type thermoplastic polyurethane available under the trademark PANDEX from DIC Bayer Polymer
Polyethylene wax: Available as "Sanwax 161P" from Sanyo Chemical Industries, Ltd.
Isocyanate compound: 4,4-diphenylmethane diisocyanate This resin blend was in the form of pellets having a length of about 3 mm and a diameter of about 1 to 2 mm. This resin material was injection-molded to form a cover over the core, thereby fabricating a two-piece solid golf ball. A plurality of dimples common to all the Examples of the invention and the Comparative Examples were formed on the surface of the cover.

The physical properties, flight performance and other characteristics of the golf balls fabricated by the above procedure were measured and evaluated according to the following methods. The results are presented in Table 3.

Ball Appearance
- NG: Upon visual examination of ball surface, urethane powder was conspicuous
- Good: Upon visual examination of ball surface, urethane powder was not noticeable.

Peel Test (Adhesion and Tensile Strength)

A tensile tester that included clamps, a drive unit, a force gauge and a recorder was used as the testing apparatus.

The golf ball was mounted on a rotatable fixture, and cuts in the form of a band having a width of 4±0.3 mm were made on the surface of the ball. At this time, in cases where the area of measurement included a cover layer that had been obtained by injection molding with a hemispherical mold, care was taken to make the cuts in such a way as to include at least one injection gate and at least one pole. Here, the term "pole" signifies a north pole or south pole relative to an equator represented by a great circle circumscribing the ball at one or a plurality of injection gates.

Next, a slit was made in the cover surface at the pole, and the cover was peeled off to a length of about 20 mm, thereby preparing the pole so that it can be fixed in a clamp of the tester. One end of the band-like test specimen in which this slit had been made was fixed in a clamp, and pulling was carried out in 23±2° C. environment at a testing speed of 50 mm/min. The tensile test was continued until the band-like specimen (cover layer) separated completely from the core surface. More specifically, when a load difference suddenly arose (i.e., when a load difference of 0.2 kgf or more occurred) as the test piece was being pulled, this was treated as the endpoint of measurement. Each of the results shown in Table 3 below is an average value for five measurement samples (N=5). Adhesion between the core and the cover layer was rated based on the following criteria.
- Excellent (Exc): 4 kgf or more (strong adhesion)
- Good: at least 3 kgf but less than 4 kgf (ample adhesion)
- Fair: at least 2 kgf but less than 3 kgf (some adhesion)
- No Good (NG): below 2 kgf (no adhesion)

Ball Initial Velocity

The initial velocity was measured using an initial velocity measuring apparatus of the same type as the USGA drum rotation-type initial velocity instrument approved by the R&A. The ball was held isothermally at a temperature of 23±1° C. for at least 3 hours, then tested in a room temperature (23±2° C.) chamber. Ten balls were each hit twice, and the time taken for the ball to traverse a distance of 6.28 ft (1.91 m) was measured and used to compute the initial velocity. This cycle was carried out over a period of about 15 minutes.

Deflection of Finished Ball

The deflection (mm) of the finished ball when compressed at a temperature of 23±1° C. and a rate of 10 mm/s under a final load of 1,275 N (130 kgf) from an initial load state of 98 N (10 kgf) was measured. The average value for 10 balls (N=10) was determined.

COR Durability to Cracking

The durability of the golf ball to cracking was evaluated using an ADC Ball COR Durability Tester produced by Automated Design Corporation (U.S.). This tester functions so as to fire a golf ball pneumatically and cause it to repeatedly strike two metal plates arranged in parallel. The incident velocity against the metal plates was set to 43 m/s. The number of shots required for the golf ball to crack was measured, and the average for five golf balls (N=5) was determined.

TABLE 3

| | | Example | | | | | | Comparative Example | | |
|---|---|---|---|---|---|---|---|---|---|---|
| | | 1 | 2 | 3 | 4 | 5 | 6 | 1 | 2 | 3 |
| Ball content | Construction | 2P | 2P | 2P | 2P | 2P | 2P | 2P | 2P | 1P |
| | Cover | urethane | urethane | urethane | urethane | urethane | urethane | urethane | urethane | none |
| | Core blend | MAA blend | MAA blend | MAA blend | MAA blend | MAA blend | ZDA blend | MAA blend | ZDA blend | MAA blend |
| | Adhesion enhancing treatment | no | no | no | no | yes | yes | no | yes | no |
| | Granulated urethane added (amount) | 3.75 | 7.5 | 22.5 | 7.5 | 7.5 | 7.5 | no | no | 7.5 |
| | Particle size | ≤1 mm | ≤1 mm | ≤1 mm | ≥1 mm, ≤2 mm | ≤1 mm | ≤1 mm | — | — | ≤1 mm |
| Ball appearance | Appearance | good | good | good | good | good | good | good | good | NG |
| | Peel test (core-cover adhesion), kgf | 2 | 2 | 2 | 2 | 5 | 4 | 1 | 3 | — |
| | Sensory test of peeling (tensile strength) | fair | fair | fair | fair | Exc | Exc | NG | good | — |
| | Initial velocity, m/s | 74 | 74 | 73.5 | 73.7 | 74 | 76 | 74 | 76 | — |
| | Deflection, mm | 3 | 3 | 3 | 3 | 3 | 3 | 3 | 3 | — |
| | COR durability (shots) | 1,200 | 1,200 | 1,200 | 1,200 | 1,800 | 800 | 800 | 500 | — |

Note:
The amounts of granulated urethane included are indicated in parts by weight per 100 parts by weight of the polybutadiene rubber.

It is apparent from Table 3 above that because no urethane powder was included in the golf ball of Comparative Example 1, the ball had a poor durability. The golf ball of Comparative Example 1, as in Comparative Example 1, contained no urethane powder, as a result of which a sufficient durability could not be obtained. The golf ball of Comparative Example 3 was a conventional one-piece type golf ball with an appearance in which urethane powder was conspicuous; as a result, a good appearance was not obtained.

The invention claimed is:

1. A solid golf ball comprising a core of at least one layer and a cover of at least one layer, wherein at least one layer of the core is formed primarily of polybutadiene and includes at least 0.05 part by weight of a polyurethane resin powder having an average particle diameter of not more than 2 mm per 100 parts by weight of rubber component, and at least one layer of the cover is formed primarily of polyurethane;
   wherein the polyurethane resin powder has a melting point which is higher than a vulcanization temperature of the core; and
   wherein the polyurethane resin powder is composed primarily of a thermoplastic polyurethane and has a melting point of from 150 to 320° C.

2. The solid golf ball of claim 1, wherein the core layer which includes the polyurethane resin powder adjoins the cover layer composed primarily of polyurethane.

3. The solid golf ball of claim 1, wherein the core includes at least 5 parts by weight of methacrylic acid and/or a metal salt of methacrylic acid as a co-crosslinking agent per 100 parts by weight of rubber component.

4. The solid golf ball of claim 1, wherein the polyurethane resin powder has been granulated by a granulator to an average particle size of not more than 1 mm.

5. The solid golf ball of claim 1, wherein the core has a hardness designed so as to gradually increase from a center of the core toward a surface of the core.

6. The solid golf ball of claim 1 which has been produced by treating a surface of the core with a solution containing a haloisocyanuric acid and/or a metal salt thereof, then encasing the core in a cover layer.

7. The solid golf ball of claim 1, wherein an amount of the polyurethane resin powder is from 5 to 20 parts by weight per 100 parts by weight of the rubber component.

8. The solid golf ball of claim 1, wherein the polyurethane resin powder is a waste material.

* * * * *